Jan. 21, 1969
N. O. ROSAEN
3,422,791
INDICATING APPARATUS
Filed Feb. 20, 1967
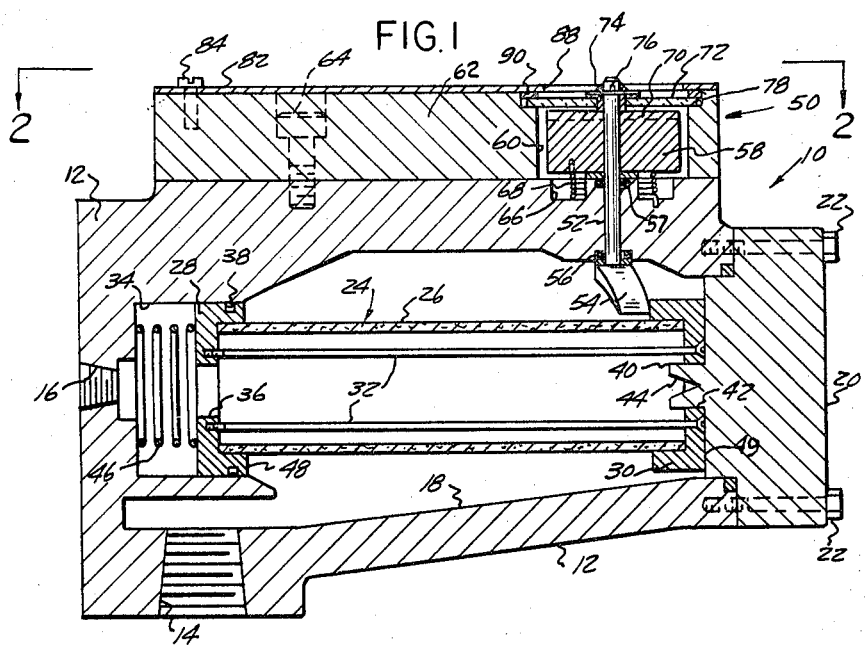
INVENTOR
NILS O. ROSAEN
BY Hauke, Krass, + Gifford
ATTORNEYS 3,422,791
INDICATING APPARATUS
Nils O. Rosaen, Bloomfield Hills, Mich., assignor to The Rosaen Filter Company, Hazel Park, Mich., a corporation of Michigan
Filed Feb. 20, 1967, Ser. No. 617,174
U.S. Cl. 116—70           5 Claims
Int. Cl. G01l 19/12

ABSTRACT OF THE DISCLOSURE

A primary indicator element, connected to means sensing a pressure differential change in a fluid system is supported for movement between positions corresponding to the instantaneous pressure differential change in the system. A second indicator element is coupled with the primary element when the pressure differential in the system exceeds an unexpected value. The position assumed by the secondary element is maintained at the position corresponding to the unexceeded magnitude of the pressure differential in the system even though the primary element fluctuates to a value corresponding to a lower instantaneous pressure differential.

BACKGROUND OF THE INVENTION

Field of the invention

This invention relates generally to indicating means for a fluid system and more particularly to means for indicating both the instantaneous and the maximum values reached by the pressure differential in a fluid system.

DESCRIPTION OF THE PRIOR ART

Indicating elements are commonly employed in fluid systems to provide a visual indication of pressure changes produced in the system. Normally devices of the prior art are intended to reflect the instantaneous value of the pressure differential in a portion of the system. However, it is often desirable to know whether or not the pressure differential of the system has exceeded a predetermined magnitude over a given period of time.

One area wherein it is often desirable to have information relating to whether or not the pressure differential in a portion of a fluid system has exceeded a particular value is associated with filter devices. Many filter devices for fluid systems employ a fluid pressure housing in which is mounted a filter cartridge unit that is automatically shiftable between filtering and nonfiltering positions in accordance with the filtering condition of the element. Thus, as the filter becomes clogged with foreign matter during prolonged use, the filter cartridge is axially shifted by a fluid pressure build up against the force of opposing biasing means to a bypass position wherein the fluid flows directly from the inlet to the outlet of the housing. Thus, this device employs a pressure build-up across a clogged filter to shift the filter to a nonfiltering position.

Suitable indicating means have been disclosed in the prior art for providing a visual indication exteriorly of the system reflecting the shifted position of the filter cartridge. One such filtering means was disclosed in U.S. Patent No. 3,276,586 to Nils O. Rosaen and issued Oct. 4, 1966. The indicating means disclosed in the aforementioned patent is useful for indicating to a user that the filter has shifted to a nonfiltering position and therefore requires either a cleaning or replacement. However, the indicating means of my aforementioned patent provides a reading associated with the instantaneous pressure differential in the fluid system. If the filter cartridge has shifted to a nonfiltering position, and the system is shut down, the fluid pressure is reduced so that the filter cartridge and the indicator resume their original positions. Thus, there is often a difficult maintenance problem in that the user cannot determine from the conventional indicating means which of a series of filters require either new or clean filter elements.

The preferred embodiment of the present invention overcomes this problem by providing a secondary indicator element which is movable to a position corresponding to the highest pressure differential produced in the system over a period of time and maintains this position regardless of the instantaneous pressure differential in the system.

SUMMARY

The preferred embodiment of the present invention, which will be subsequently described in greater detail, is described with reference to a filter device having a movable filter cartridge arranged for movement between a filtering position and a bypass or non-filtering position. The instantaneous position of the filter element is related to the instantaneous pressure differential produced across the element and is associated with the degree of contamination of the filter element. However, it is to be understood that the invention is useful in a broad variety of situations wherein it is desirable to know whether or not the pressure differential in the fluid system has reached a particular value over a period of time regardless of the instantaneous pressure differential in the system.

The preferred embodiment of the invention contemplates a filter housing disposed in the fluid system with a filter cartridge movable in the housing between the filter and bypass positions and which engages an actuating element carried on the inner end of a shaft having its outer end disposed exteriorly of the filter housing. The shaft is rotated through an arc corresponding to the displacement of the filter element. A dial fixed to the outer end of the shaft is associated with a scale mounted on the housing to provide a visual indication of the position of the filter element. A secondary dial element taking the form of a flat transparent element is supported for rotation to the shaft and overlies the primary dial. The primary and secondary dials have cooperating abutments which are engageable upon rotation of the primary dial in a direction corresponding to an increasing pressure differential value. When the pressure differential across the device increases from a previous value, the abutments disengage as the primary dial rotates to a position corresponding to the instantaneous pressure differential. While the secondary dial remains stationary in a position associated with the unexceeded pressure differential value. Thus, the user can readily ascertain not only the position of the filter element associated with the instantaneous pressure differential value but also the position of the filter element associated with the highest pressure differential value reached over a given period of time.

The preferred embodiment of the present invention thus permits the user to shut down a system employing a series of filter elements while permitting him to readily ascertain which of the filter elements has shifted to a position requiring replacement or cleaning even though there is no pressure in the system.

It is therefore an object of the present invention to provide improved indicating means for a fluid system by providing a device having a dial movable to a position corresponding to an unexceeded pressure differential value and which is retained in this position even though the instantaneous pressure differential of the fluid in the system is reduced below the unexceeded value.

It is another object of the present invention to provide indicating means for a fluid system having a pair of dials, one dial movable to a position corresponding to an instantaneous pressure differential in the system and the other dial movable to a position associated with the unexceeded value of the pressure differential in the system over a given period of time.

It is a still further object of the present invention to provide an indicating device for a fluid pressure system having a pair of dial elements supported on a common shaft, the shaft connected to a sensing means arranged to rotate the shaft through an arc corresponding to the instantaneous pressure differential in the system, one of the dials fixed to the shaft and the other dial supported for rotation to the shaft, said dials having cooperating abutments engageable with one another when the fixed dial rotates in a direction corresponding to an increasing pressure differential value and disengageable when the fixed dial rotates in a direction corresponding to a decreasing value.

Still further objects and advantages of the present invention will become apparent to those skilled in the art to which the invention pertains upon reference to the following detailed description.

DESCRIPTION OF THE DRAWING

The description refers to the accompanying drawing in which like reference characters refer to like parts throughout the several views and in which:

FIG. 1 is a longitudinal sectional view through a filter device employing indicating means illustrating a preferred embodiment of the invention, FIG. 2 is a view taken along lines 2—2 of FIG. 1, FIG. 3 is a top elevational view of a dial element of the preferred indicator assembly, FIG. 4 is a side elevational view of the transparent dial element shown in FIG. 3, FIG. 5 is a top elevational view of a frictional retaining ring used in the preferred indicator assembly, FIG. 6 is a side elevational view of the ring shown in FIG. 5, FIG. 7 is a top elevational view of the dial member of the preferred indicator assembly, and FIG. 8 is a side elevational view of the dial member shown in FIG. 7.

DESCRIPTION OF THE PREFERRED EMBODIMENT

Now referring to the drawings, a preferred filter device 10 is illustrated as comprising a housing member 12 having a fluid inlet 14, a fluid outlet 16 and a fluid chamber 18 connecting said fluid inlet 14 with said fluid outlet 16. A housing cap member 20 is attached to the housing 12 by a plurality of threaded fasteners 22. The housing cap 20 is arranged opposite the outlet 16 as illustrated.

A filter cartridge assembly 24 is disposed in the chamber 18 and is movable between axial positions toward and away from the cap member 20. The cartridge 24 comprises a tubular filter element 26 retained between a pair of annular cap members 28 and 30 by elongated threaded fasteners 32.

The cap 28 is mounted for axial slidable movement in a cylindrical guide portion 34 provided in chamber 18 adjacent the outlet 16. The cap 28 also has an axial passage 36 permitting fluid communication between the interior of the filter element 26 and the outlet 16. A piston ring 38 carried on the exterior surface of the cap 28 provides a sliding engagement between the cap 28 and the sidewall of the cylindrical guide portion 34.

The housing cap 20 is provided with an inwardly directed, cylindrical boss 40 formed on an axial extension of the axis of the guide portion 34. The end cap 30 has an axial bore 42 slidably engaged with the boss 40. The boss 40 is also provided with a plurality of annularly spaced, tapered bypass slots 44. Thus it can be seen that the filter cartridge 24 is supported for axial movement toward and away from the housing cap 20.

A spring bias member 46 disposed between the end of the filter chamber 18 and the end cap 28 normally biases the filter cartridge 24 toward a position wherein the end cap 30 is adjacent the housing cap 20. This position is associated with an unclogged filter element 26 and provides a fluid passage wherein the fluid enters through the inlet 14, passes in filtering relationship radially into the filter element 26 and then exits axially from the filter element 26 through the bore 36 and the cap 28 for discharge through the outlet 16. However, as the filter element 26 accumulates foreign matter from the fluid, a pressure differential develops between the inlet portions and the discharge portions of the filter element. This pressure differential is reflected in a pressure increase on the exterior surface of the filter element 26 which develops a net axial force on an annular surface 48 of cap 28 and a roughened annular surface 49 of cap 30. This axial force acts in opposition to the bias of the spring member 46. When this force acting on surfaces 48 and 49 overcomes the bias of the spring 46, the cartridge 24 begins to shift toward the left and toward the outlet 16. As the cartridge shifts toward the outlet 16, the end cap 30 moves away from the housing cap 20 and toward a position opening the bypass slots 44. The fluid then flows between the end cap 30 and the housing cap 20 through the bypass slots 44 and axially into the filter element 26, thereby bypassing the filter 26.

Indicating means generally indicated at 50 are mounted to the housing 12 and arranged to indicate the position of the filter cartridge 24 in the chamber 18. This position corresponds to the fluid pressure differential existing across the filter element 26. The indicating means 50 comprises a rotatably mounted shaft 52 supported in the housing 12. An actuating lever 54 is fixed to the inner end of the shaft 52 and arranged to engage the end cap 30.

Annular seals 56 and 57 provide a fluid tight engagement between the shaft 52 and the housing 12. A dial member 58 is clamped to the outer portion of the shaft 52 and is disposed in a bore 60 provided in a mounting block 62. Mounting block 62 is mounted on the housing 12 by threaded fasteners 64.

A counterbore 66 provided in housing 12 provides means for disposing a spring member 68. Spring 68 is anchord to the housing 12 and acts on the dial 58 in a counterclockwise direction to provide continuous engagement between the actuating lever 54 and the end cap 30.

A raised portion 70 is defined on the upper surface of the dial 58 and preferably is formed in the shape of an arrow. Thus, it is to be understood that the dial 58 and the shaft 52 rotate in combination and in response to the displacement of the cap 30 acting on the actuating lever 54.

A transparent, disc shaped, dial element 72 is supported by a bushing 74 for rotation relative to the shaft 52. A self-locking retainer ring 76 prevents axial displacement of the dial 72 and the bushing 74.

An annular shoulder 78 formed at the upper end of the bore 60 provides means for seating the dial disc 72 so that the disc 72 is slightly spaced from the dial 58.

The transparent dial 72 is provided with an arcuate raised portion 80 on its underside. Portion 80 is intended to come into abutment with the raised portion 70 of the dial 58 as the dial 58 rotates clockwise.

An indicator plate 82 is mounted on the upper surface of the block 62 by threaded fasteners 84. The indicator plate 82 is provided with indicia 86 associated with the various positions of the filter cartridge 24 within the housing 12. The indicator plate 82 is provided with a circular opening 88 to permit viewing the position of the raised portion 70 of the dial 58 through the transparent dial 72.

A spring member 90 is disposed adjacent the opening 88 and between the plate 82 and the dial 72 to bias the transparent dial 72 against the seat 78 so that the dial 72 is frictionally retained in place.

Preferably the transparent dial 72 is provided with an opaque pointer 92 to provide a means for indicating rotation of the dial 72 with respect to a predetermined reference position.

In operation, the indicating means 50 is preset when the filter cartridge 24 is in an unclogged condition with the end cap 30 in abutment with the housing cap 20. In this position, the dial 58 is arranged so that the raised portion 70 is directed toward the "filter is clean" position. The transparent dial 72 is rotated counterclockwise until the abutment portion 80 is engaged with the raised portion 70 of the dial 58. As a pressure differential develops across the filter element 26 produced by the accumulation of foreign matter on the filter, the filter cartridge 24 starts to move toward the outlet 16. The movement of the filter cartridge 24 in turn produces a corresponding rotation of the dial 58 and the transparent dial 72. When the filter cartridge 24 has moved toward the left sufficiently to open the bypass route around the filter cartridge and through the bypass slot 44, the dial 58 in turn is positioned such that the raised portion 70 registers with the "Bypassing" position. This rotation of dial 58 in turn rotates the transparent dial 72 so that it too registers with the "Bypassing" condition.

Now, it can be seen that if the pressure differential in the filter housing 12 is reduced so that the spring bias member 46 returns the filter cartridge 24 toward its rightmost position, that the dial 58 will rotate counterclockwise to its original position. This is because the spring 68 maintains the dial 58 in a position corresponding to the instantaneous pressure differential in the housing 12. However, it can also be seen that as the dial 58 rotates counterclockwise that the raised portion 70 will disengage from the raised portion 80 of the transparent dial so that the transparent dial 72 always remains in its extreme clockwise position. Thus, while the dial 58 provides a continuous visual indication of the pressure differential within the housing 12 as related to the instantaneous position of the filter cartridge 24, the transparent dial is always disposed in the clockwise position associated with the highest pressure differential reached over a period of time.

The transparent dial 72 can be easily restored to its present position by an intentional rotation in a counterclockwise direction so that the raised portion 80 is in abutting engagement with the raised portion 70 of the dial 58.

Although I have described but one preferred embodiment of my invention, it is to be understood that various changes can be made in the apparatus as described without departing from the spirit of the invention as defined in the scope of the appended claims.

I claim:

1. Indicating apparatus for a fluid system for indicating an incremental change in a pressure differential in said fluid system, said apparatus comprising:
    means for sensing a change in the magnitude of the pressure differential, said sensing means operable to produce a signal corresponding to the instantaneous magnitude of said fluid pressure differential,
    an actuating member operably connected to said sensing means and movable between positions corresponding to said signal,
    an indicating element mounted exteriorly of said fluid system operably connected to said actuating member and movable therewith only when said actuating member moves to a position corresponding to an increase in said pressure differential over a predetermined value, and scale means associated with said indicating element to provide a visual indication of said fluid pressure differential,
    said sensing means including a shaft supported for rotation and means operable to rotate said shaft to a position corresponding to the instantaneous magnitude of the pressure differential of said fluid in said system,
    said indicating element supported for rotation about a common axis with said shaft,
    means coupling said shaft to said indicating element only when the pressure differential exceeds a previously unexceeded magnitude,
    said coupling means comprising said indicating element having a first abutment, said shaft having an indicator portion having a second abutment movable toward and away from said first abutment depending on whether the instantaneous pressure differential of said fluid is increasing or decreasing, said second abutment coming into engagement with said first abutment when said pressure differential exceeds a previously unexceeded magnitude to produce rotation of said indicating element to a new position,
    said indicator portion cooperating with said scale means to provide an instantaneous visual indication of the pressure differential of the fluid in said system and said indicating element and said scale means providing a reading of the unexceeded pressure differentials in said fluid system, and
    a support member, having a surface and a recess in said surface, said shaft mounted to said support member and extending into said recess for rotation with respect to said support member, said scale means being disposed on said surface about said recess, said indicator portion being disposed in said recess, said indicating element comprising a flat transparent member overlaying said indicator portion, bearing means supporting said transparent member for rotation relative to said shaft and said first abutment being formed on the underside of said transparent member.

2. The invention as defined in claim 1, including resilient means frictionaly retaining said indicating element in the position corresponding to said unexceeded magnitude.

3. The invention as defined in claim 2, wherein said last mentioned means comprise said support member having an annular shoulder, said transparent member having a peripheral edge overlapping said annular shoulder, means biasing said transparent member against said annular shoulder, said biasing means permitting said transparent member to rotate in combination with said indicator portion when said cooperating abutments are in engagement.

4. A filter device having a housing, a filter element disposed within said housing and movable therein to a position depending upon the pressure differential across the filter element, means for indicating the position of said filter element exteriorly of the housing to thereby indicate the pressure differential across said filter element said indicating means comprising:
    a shaft mounted to said housing for rotation with respect thereto, said shaft having an inner end disposed within said housing and an outer end disposed exteriorly of said housing,
    means carried on the inner end of said shaft for rotating said shaft in response to changes in the position of said filter element,
    a first indicator member carried by said shaft exteriorly of said housing and rotatable therewith to indicate the position of said filter element and thus the pressure differential across said filter element,
    a second indicator member carried by said shaft and rotatable with respect thereto,
    said second indicator member comprising a flat transparent member overlying said first indicator member, and
    said first indicator member and said flat transparent member each having abutments with said abutments being disposed to produce rotation of said transparent member only when said first indicator member is rotating to a position associated with an increase in the magnitude of said pressure differential over a previously unexceeded maximum value.

5. A filter device having a housing, a filter element disposed within said housing and movable therein to a position depending upon the pressure differential across the filter element, means for indicating the position of said filter element exteriorly of said housing to thereby indicate the pressure differential across said filter element said indicating means comprising:

a shaft mounted to said housing for rotation with respect thereto, said shaft having an inner end disposed within said housing and an outer end disposed exteriorly of said housing, means carried on the inner end of said shaft for rotating said shaft in response to changes in the position of said filter element, a first indicator member and a second indicator member carried by said shaft exteriorly of said housing, one of said indicator members being fixed to said shaft and being rotatable therewith to indicate the position of said filter element and thus the pressure differential across said filter and the other of said indicator members being rotatable about said shaft and with respect thereto, one of said indicator members comprising a flat transparent member overlying the other of said indicator members, said flat transparent member and the other of said indicator members each having abutments with said abutments being disposed to produce rotation of the indicator member mounted freely to said shaft upon rotation of the indicator member fixed to said shaft only when the fixed indicator member is rotating to a position associated with an increase in the magnitude of said pressure differential over a previously unexceeded maximum value.

References Cited

UNITED STATES PATENTS

| 1,018,582 | 2/1912 | Nelson | 73—396 |
| 3,224,583 | 12/1965 | Rosaen | 210—90 |
| 3,232,432 | 2/1966 | Rosaen | 210—90 |
| 3,276,586 | 10/1966 | Rosaen | 210—90 |
| 3,348,684 | 10/1967 | Wilbur. | |

S. CLEMENT SWISHER, *Acting Primary Examiner.*

DONALD O. WOODIEL, *Assistant Examiner.*

U.S. Cl. X.R.

73—396; 210—90